United States Patent
Gierer et al.

(10) Patent No.: US 8,311,715 B2
(45) Date of Patent: Nov. 13, 2012

(54) MOTOR VEHICLE TRANSMISSION AND METHOD FOR MONITORING FRICTIONAL ENGAGEMENT IN SAME IN A PRESET NEUTRAL OR PARKING POSITION

(75) Inventors: Georg Gierer, Kressbronn (DE);
Christian Popp, Kressbronn (DE);
Thilo Schmidt, Meckenbeuren (DE);
Klaus Steinhauser, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1363 days.

(21) Appl. No.: 11/959,653

(22) Filed: Dec. 19, 2007

(65) Prior Publication Data
US 2008/0167783 A1 Jul. 10, 2008

(30) Foreign Application Priority Data
Jan. 10, 2007 (DE) .......................... 10 2007 001 496

(51) Int. Cl.
*B60W 10/02* (2006.01)
(52) U.S. Cl. ................ 701/62; 701/51; 701/58; 701/68; 477/906; 192/3.51
(58) Field of Classification Search .................... 475/31, 475/59–62, 118, 121, 122, 125; 701/51, 701/53, 57, 58, 60–62, 67, 68; 477/52, 53, 477/60, 61, 114, 906; 192/3.51–3.63
See application file for complete search history.

(56) References Cited

U.S. PATENT DOCUMENTS

| | | | | |
|---|---|---|---|---|
| 5,018,068 A * | 5/1991 | Aoki et al. | ...................... 701/53 |
| 5,609,067 A * | 3/1997 | Mitchell et al. | ............. 74/336 R |
| 5,799,487 A * | 9/1998 | Valsamis | ......................... 60/487 |
| 6,023,648 A | 2/2000 | Murasugi et al. | |
| 6,292,730 B1 * | 9/2001 | Takizawa et al. | ............... 701/51 |
| 6,497,312 B1 * | 12/2002 | Sasse et al. | .................. 192/3.29 |
| 7,912,616 B2 * | 3/2011 | Tsukada et al. | ................. 701/59 |
| 2006/0259223 A1 | 11/2006 | Schiele et al. | |
| 2006/0293146 A1 * | 12/2006 | Nakayashiki et al. | .......... 477/76 |

FOREIGN PATENT DOCUMENTS

| | | |
|---|---|---|
| DE | 195 25 867 A1 | 1/1997 |
| DE | 197 28 429 A1 | 1/1998 |
| DE | 10 2005 021 924 A1 | 11/2006 |
| DE | 10 2006 014 947 A1 | 10/2007 |

\* cited by examiner

*Primary Examiner* — Dalena Tran
*Assistant Examiner* — Spencer Patton
(74) *Attorney, Agent, or Firm* — Davis & Bujold, P.L.L.C.

(57) ABSTRACT

A method for monitoring frictional engagement in an automatic or automated motor vehicle transmission having a hydrodynamic starter element when the transmission is in a preset neutral or parking position and the automatic or automated motor vehicle transmission controlled by this method. When the motor vehicle is at or close to a standstill in a preset neutral or parking position, the current transmission rotational input speed and a current engine rotational speed of the drive motor are determined and based on the speed ratio between the current transmission rotational input speed and the current engine rotational speed an error is found to be present if the speed ratio is less than a predefined threshold value, which is less than/equal to 1.

15 Claims, 1 Drawing Sheet

MOTOR VEHICLE TRANSMISSION AND METHOD FOR MONITORING FRICTIONAL ENGAGEMENT IN SAME IN A PRESET NEUTRAL OR PARKING POSITION

This application claims priority from German Application Serial No. 10 2007 001 496.3 filed Jan. 10, 2007.

FIELD OF THE INVENTION

The invention relates to a method for monitoring the frictional engagement in an automatic or automated motor vehicle transmission, having a hydrodynamic starter element (torque converter or hydrodynamic clutch), when the transmission is in a preset neutral or parking position, as well as the automatic or automated motor vehicle transmission controlled by this method.

BACKGROUND OF THE INVENTION

Increasing demands placed on the driving, operating and control safety of modern motor vehicles require increased monitoring of driving states of the vehicle. For example, in vehicle transmissions having automatic or automated gear or gear ratio changes, monitoring the slippage in the transmission is part of the state of the art. Any impermissible slippage occurring in the transmission outside of gearshifts or gear ratio changes is typically determined by a simple plausibility query of the rotational speed and/or gear ratio conditions. Any impermissible slippage occurring in the transmission during a gear or gear ratio change is typically determined by monitoring the rotational speed behavior or required rotational speed and/or gear ratio tolerance ranges. In either case, typically the signals of rotational speed sensors at the transmission input and the transmission output are evaluated. An automatic transmission comprising a starter element located in the power flow, between the drive motor of the vehicle and the transmission, and configured as a torque converter or hydrodynamic clutch is typically provided with a turbine rpm sensor at the transmission input and a so-called output side rpm sensor at the transmission output. In order to be able to determine slippage in the transmission in each case measurable minimum rotational speeds are required, which are dependent on the respective available rotational speed detection system (sensor type, pulse sequence and/or pulse separation). This means that the vehicle must roll at a certain minimum speed so that usable measurement signals are available for the gear and/or gear ratio monitoring process.

Particularly in the case of so-called "shift-by-wire systems", where no mechanical connection exists between the automatic transmission and the driving position selection device of the automatic transmission disposed in the vehicle interior and operable by the driver, particularly high demands are placed on the protective and monitoring mechanisms in order to verify, in particular whether the operating commands of the driver are properly implemented or carried out in the transmission. A further complicating factor for the protective and monitoring mechanisms is that in modern automatic, multi-ratio transmissions, often times the shifting elements have multiple uses such that, in modern automatic, multi-ratio transmissions, at least one of the shifting elements thereof is shifted in a non-positive manner in different gears.

If such an automatic transmission is in the neutral position, the same must be secured in the neutral position against inadvertent torque transmission or a inadvertent frictional engagement, because the motor vehicle, having an automatic transmission of this type, would otherwise be unintentionally set in motion. In such an automatic transmission in the parking position, if an inadvertent torque connection or frictional engagement were to exist, this could result in damage to the transmission. Thus, in the previously unpublished German patent application DE 10 2006 014 947.5 by the Applicant, a method is proposed for operating an automatic multi-ratio transmission wherein, for a preset neutral position of the transmission, in order to secure the transmission from inadvertent torque connection or frictional engagement, at least one of three shifting elements of the transmission that is engaged in the forward gear or reverse gear is completely disengaged. In this way, at least during normal operation of the transmission, it is ensured that the drive motor and the drive axle of the motor vehicle are completely separated from one another when the transmission is in a neutral position.

In an automatic multi-ratio transmission which is such that during normal operation in the neutral position at least a first shifting element, which is required to establish a frictional engagement in the transmission, is completely disengaged and a second shifting element, which is likewise required to establish the frictional engagement in the transmission, is only partially pressurized—which is to say a low pressure is applied by a pressurized medium, the pressure not yet being sufficient for torque transmission—or is also completely disengaged, in the neutral position a frictional engagement may occur in the transmission in a faulty and inadvertent manner if these two shifting elements are erroneously selected or if these two shifting elements, as such, exhibit faulty behavior or a defect. A simple error accordingly does not necessarily result in the inadvertent frictional engagement in the transmission.

SUMMARY OF THE INVENTION

Starting from this basis, it is the object of the present invention to provide a method by which erroneous frictional engagement of an automatic or automated motor vehicle transmission in the neutral position or parking position thereof is reliably recognized. Furthermore, an automatic or automated motor vehicle transmission which can be controlled by this method is also disclosed.

BRIEF DESCRIPTION OF THE DRAWINGS

Embodiments of the invention are described in more detail below with reference to the drawings which show.

DETAILED DESCRIPTION OF THE INVENTION

Figure 1:
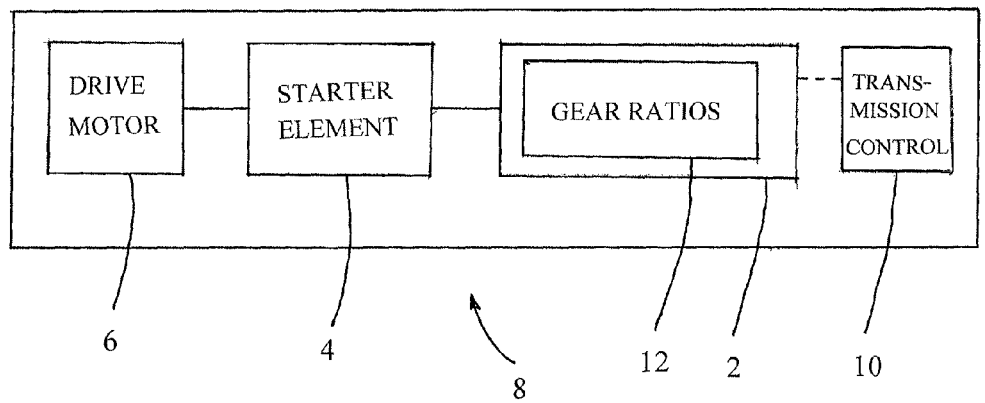
FIG. 1 a schematic illustration of a motor vehicle which comprises a transmission having a starter element according to the invention.
Figure 2:
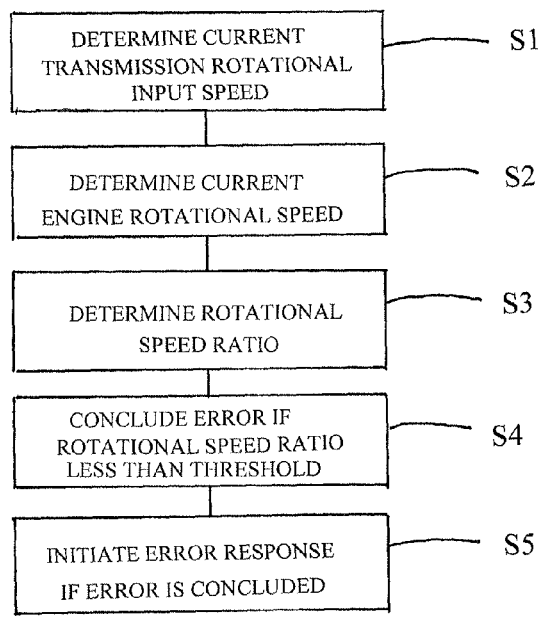
FIG. 2 a flow diagram of a method of monitoring frictional engagement in a transmission having a starter element according to the invention.

According to the invention and shown in FIGS. 1, 2, a method for monitoring a frictional engagement in an automatic or automated motor vehicle transmission 2, having a hydrodynamic starter element 4 disposed in the power flow direction between the motor vehicle drive motor 6, when the transmission is in a preset neutral or parking position is proposed, the motor vehicle 8 being at or close to a standstill and at a preset neutral or parking position of the transmission, a current transmission rotational input speed and a current engine rotational speed of the drive motor 6 are determined S1, S2, subsequently a speed ratio is determined of the current transmission rotational input speed to the determined current engine rotational speed S3, and automatically an error is concluded S4 if the speed ratio of the determined current transmission rotational input speed to the determined current engine rotational speed is smaller than a predefined threshold value, which again is less than/equal to 1. After detection of an error, a response to the error is initiated S5. The transmission rotational input speed is often referred to as the turbine rpm n_t of the hydrodynamic starter element, so that the current speed ratio of the determined current transmission rotational input speed and the determined current engine rotational speed can also be listed as the quotient n_t/n_mot.

Typically, the predefined threshold value for the speed ratio n_t/n_mot ranges between 0.7 and 1. It may also be provided that the predefined threshold value for the above speed ratio n_t/n_mot is defined as a function of a current temperature, particularly as a function of a current transmission temperature.

With respect to the response to the detected error, according to the invention, one embodiment of the invention proposes that a reference to an error is initiated promptly after detection of the error.

A second embodiment, regarding the response to the error, detected according to the invention, proposes that after detection of the error, taking the determined speed ratio n_t/n_mot into consideration and through a design-based identification of the hydrodynamic starter element, a current transmission input torque is determined, and that an error response is only initiated if the determined current transmission input torque exceeds or has exceeded a defined threshold value. This current transmission input torque is often also referred to as the so-called turbine torque M_t of the hydrodynamic starter element.

A third embodiment regarding the response to the error detected, according to the invention proposes that following error detection, taking the determined speed ratio n_t/n_mot into consideration and through a design-based identification of the hydrodynamic starter element and the gear ratio, a current transmission output torque is determined, and that an error response is only initiated if the determined current transmission output torque exceeds or has exceeded a defined threshold value. Instead of the above transmission output torque, an equivalent axle or wheel torque of the driven axle of the motor vehicle can also be used.

A fourth embodiment regarding the response to the error detected, according to the invention, proposes that following an error detection, an error response is only initiated if a sensed transmission output torque exceeds or has exceeded a defined threshold value. To this end, a torque sensor of any type may be provided which, depending on the type and installation condition, may be disposed inside or outside of the transmission housing. Alternatively, the torque sensor may be disposed on the driven axle or a driven wheel of the motor vehicle for the purpose of sensing a torque that is equivalent to the transmission output torque.

During normal operation of the transmission, when the motor vehicle is at or close to standstill and the transmission is in a preset neutral or parking position, a speed ratio n_t/n_mot of a current transmission rotational input speed n_t and a current engine rotational speed n_mot will adjust to a value in the range between 0.9 and 1, wherein the precise value thereof will primarily depend on the internal drag torque of the hydrodynamic starter element that is used, which is configured as a known torque converter or as a known hydrodynamic clutch. Particularly at low transmission oil temperatures, a value smaller than 0.9 is set.

Reduction of the speed ratio n_t/n_mot with the motor vehicle at or close to standstill and the transmission in a preset neutral or parking position to a value that is significantly lower than 0.7 or even to a value close to zero, can only be brought about by inadvertent partial or complete engagement of transmission shifting elements. If the transmission used is configured as an automatic, multi-ratio transmission in accordance with the above-mentioned patent application DE 10 2006 149 47.5, then a simultaneous defect of the two shifting elements themselves or of their control is concluded.

If it is determined, by way of the inventive method, that the transmission in the neutral or parking position is, in fact, frictionally engaged, then a serious error exists either directly in the transmission or in the signal transmission, between the driving position selection device and the transmission, requiring a response from the transmission and/or vehicle. Such measures may be, for example:

Activation of an alternative function of the transmission, wherein a previously partially pressurized transmission shifting element, which generated the detected inadvertent frictional engagement, is completely disengaged;

Interruption of the frictional engagement in the transmission by disengaging one of the transmission shifting elements involved in the frictional engagement;

Automatic actuation of a parking lock of the transmission to lock an output shaft of the transmission and prevent rotation thereof, particularly in a positive manner;

Automatic actuation of a braking system or a parking brake of the motor vehicle;

Triggering of a warning indicator visible to the driver;

Triggering of an acoustic warning signal to the driver;

Entry in a fault memory of the transmission;

Stopping or shut-down of the motor driving the transmission.

Of course, individual measures can also be combined with one another.

The inventive determination of the actual frictional engagement in the transmission 2 is not limited to a specific transmission type, but can be used universally in automatic and automated transmissions having an electro-hydraulic or electro-pneumatic transmission control 10 of any type, provided that a hydrodynamic starter element is provided as the starter element 4. For example, the hydrodynamic starter element can be configured as a torque converter (for example, a so-called TRILOK converter type) or as a hydrodynamic clutch (for example, a so-called Föttinger coupling). Possible transmission types, by way of example, also include an automatic multi-ratio transmission, an automated manual transmission, an automatic transmission having mechanically continuously variable gear ratios 12, with or without power splitting, an automatic transmission having hydrostatically continuously variable gear ratios 12, with or without power splitting. These automatic and automated transmissions may be part of a conventional power train comprising an internal combustion engine as the only drive motor of the motor vehicle, or may also be part of a hybrid power train comprising an internal combustion engine and electric motor as the driving motors of the motor vehicles.

The invention claimed is:

1. A method of using an electronic control device for detecting and responding to a transmission error in one of an automatic motor vehicle transmission and an automated motor vehicle transmission, the transmission having a starter element and being in one of a preset neutral position and a parking position, the transmission being connected to a drive motor of the motor vehicle via the starter element, the starter element being either a torque converter or a hydrodynamic clutch, the method comprising the steps of:

determining, via the electronic control device, a current transmission rotational input speed when the motor vehicle is at least substantially motionless and the transmission is in one of a preset neutral position and a parking position;

determining, via the electronic control device, a current engine rotational speed of the drive motor when the motor vehicle is at least substantially motionless and the transmission is in one of the preset neutral position and the parking position;

calculating, via the electronic control device, a speed ratio as the ratio of the current transmission rotational input speed to the current engine rotational speed;

providing a preset ratio threshold value of one of equal to 1 and less than 1;

comparing the speed ratio with the ratio threshold value; and if the speed ratio is less than the ratio threshold value, then determining, via the electronic control device, that an error is present in the transmission; and initiating responsive measures in at least one of the transmission and the motor vehicle if the presence of an error in the transmission is determined.

2. The method according to claim 1, further comprising the step of defining the ratio threshold value as a value having a range between 0.7 and 1.

3. The method according to claim 1, further comprising the step of defining the ratio threshold value as a function of a current transmission temperature.

4. The method according to claim 1, further comprising the step of promptly initiating a response to the error when the error is present in the transmission.

5. The method according to claim 1, further comprising the steps of after concluding that the error is present in the transmission, determining a current transmission output torque based on the speed ratio, the starter element, and a gear ratio; and initiating a response to the error only if the determined current transmission output torque one of exceeds and has exceeded a defined output torque threshold value.

6. The method according to claim 1, further comprising the step of initiating an error response following concluding that the error is present in the transmission only if a sensed transmission output torque one of exceeds and has exceeded a output torque defined threshold value.

7. The method according to claim 1, further comprising the step of performing, after concluding the presence of the error in the transmission, as an error response at least one of:

activating an alternative function of the transmission, wherein a previously partially pressurized transmission shifting element, which generated a detected inadvertent frictional engagement, is completely disengaged;

interrupting the frictional engagement in the transmission by disengaging at least one transmission shifting element involved in the frictional engagement;

automatically actuating a parking mechanism of the transmission to lock an output shaft of the transmission and prevent rotation thereof;

automatically actuating one of a braking system and a parking brake of the motor vehicle;

triggering a visible warning indicator to alert a driver;

triggering an acoustic warning signal to alert the driver;

entering the error into a fault memory of the transmission; and one of stopping and shutting down the drive motor driving the transmission.

8. A method of using an electronic control device for detecting and responding to a transmission error in one of an automatic motor vehicle transmission and an automated motor vehicle transmission, the transmission having a starter element and being in one of a preset neutral position and a parking position, the transmission being connected to a drive motor of the motor vehicle via the starter element, the starter element being either a torque converter or a hydrodynamic clutch, the method comprising the steps of:

determining, via the electronic control device, a current transmission rotational input speed when the motor vehicle is at least substantially motionless and the transmission is in one of a preset neutral position and a parking position;

determining, via the electronic control device, a current engine rotational speed of the drive motor when the motor vehicle is at least substantially motionless and the transmission is in one of the preset neutral position and the parking position;

calculating, via the electronic control device, a speed ratio as the ratio of the current transmission rotational input speed to the current engine rotational speed;

providing a preset ratio threshold value of one of equal to 1 and less than 1;

comparing the speed ratio with the ratio threshold value; and if the speed ratio is less than the ratio threshold value, then determining, via the electronic control device, that an error is present in the transmission;

initiating responsive measures in at least one of the transmission and the motor vehicle if the presence of an error in the transmission is determined;

following the detection of the error, determining a current transmission input torque based on both the speed ratio and the starter element, and initiating a response to the error only if the determined current transmission input torque one of exceeds and has exceeded a preset input torque threshold value.

9. A motor vehicle transmission comprising:

a starter element being arranged, in a power flow direction, between a drive motor and the motor vehicle transmission, the starter element being engagable to transmit rotation of the drive motor, which rotates at a drive motor rotational speed, into rotation of a transmission input, which rotates at a transmission rotational input speed, and an electronic control device that controls the motor vehicle transmission depending on a speed ratio, which is a ratio of the transmission rotational input speed and the engine rotational speed when the motor vehicle transmission is in one of a preset neutral position and a parking position and the motor vehicle is substantially motionless, wherein the electronic control device registers the transmission as being in an error state if the speed ratio is less than a preset threshold value which is one of less than and equal to 1, and the transmission being controllable in response to the detection of an error.

10. The motor vehicle transmission according to claim 9, wherein the motor vehicle transmission is an automatic multi-ratio transmission.

11. The motor vehicle transmission according to claim 9, wherein the motor vehicle transmission is an automatic transmission having mechanically continuously variable gear ratios and one of with power splitting and without power splitting.

12. The motor vehicle transmission according to claim 9, wherein the motor vehicle transmission is an automatic transmission having hydrostatically continuously variable gear ratios and one of with power splitting and without power splitting.

13. The motor vehicle transmission according to claim 9, wherein the motor vehicle transmission is an automated manual transmission.

14. The motor vehicle transmission according to claim 9, wherein the starter element is a torque converter.

15. The motor vehicle transmission according to claim 9, wherein the starter element is a hydrodynamic clutch.

* * * * *